United States Patent
Ning

(10) Patent No.: US 10,742,877 B1
(45) Date of Patent: Aug. 11, 2020

(54) IMAGING MODULE

(71) Applicant: Alex Ning, Carlsbad, CA (US)

(72) Inventor: Alex Ning, Carlsbad, CA (US)

( * ) Notice: Subject to any disclaimer, the term of this patent is extended or adjusted under 35 U.S.C. 154(b) by 0 days.

(21) Appl. No.: 16/550,668

(22) Filed: Aug. 26, 2019

Related U.S. Application Data

(60) Provisional application No. 62/724,776, filed on Aug. 30, 2018.

(51) Int. Cl.
*H04N 5/232* (2006.01)
*G06T 7/80* (2017.01)
*G06T 5/50* (2006.01)
*H04N 17/00* (2006.01)

(52) U.S. Cl.
CPC .......... *H04N 5/23229* (2013.01); *G06T 5/50* (2013.01); *G06T 7/80* (2017.01); *H04N 17/002* (2013.01)

(58) Field of Classification Search
CPC .... H04N 5/23229; H04N 17/002; G06T 7/80; G06T 5/50
See application file for complete search history.

(56) References Cited

U.S. PATENT DOCUMENTS

| | | | |
|---|---|---|---|
| 7,457,458 B1* | 11/2008 | Daniel | H04N 5/21 348/E17.005 |
| 10,003,744 B2 | 6/2018 | watanabe | |
| 2002/0080242 A1* | 6/2002 | Takahashi | H04N 5/217 348/207.99 |
| 2007/0196095 A1* | 8/2007 | Perala | G03B 15/03 396/155 |
| 2015/0254810 A1 | 9/2015 | Heidrich et al. | |
| 2015/0264265 A1 | 9/2015 | Iwata et al. | |
| 2016/0173794 A1* | 6/2016 | Beck | H04N 5/361 348/244 |

OTHER PUBLICATIONS

Nikonusa, Chromatic Aberration, https://www.nikonusa.com/en/learn-and-explore/a/products-and-innovation/chromatic-aberration.html, Visited Aug. 26, 2019.
Adobe, , https://helpx.adobe.com/photoshop/using/adjusting-image-sharpness-blur.html, Visited Aug. 26, 2019.

* cited by examiner

*Primary Examiner* — Michael E Teitelbaum
(74) *Attorney, Agent, or Firm* — Mark Wisnosky

(57) ABSTRACT

An imaging module is described that acquires images of objects and outputs a digital image of the objects that is corrected for aberrations and flaws due to design, manufacturing constraints and variability, and, the local environment (temperature and humidity). The imaging module includes memory to store adjustment parameters, environmental sensors, and, a computing device that processes the raw acquired image into a corrected processed image. The imaging module is used with a test apparatus to calibrate the imaging module and calculate empirically determined correction factors that are stored in memory within the imaging module.

4 Claims, 4 Drawing Sheets

IMAGING MODULE

CROSS-REFERENCE TO RELATED APPLICATIONS

This application claims priority to U.S. Provisional Application 62/724,776, filed Aug. 30, 2018, titled Imaging Module by the same inventor.

STATEMENT REGARDING FEDERALLY SPONSORED RESEARCH OR DEVELOPMENT

Not Applicable.

BACKGROUND OF THE INVENTION

Technical Field

The invention relates to an imaging module and means to correct image distortions in acquired images for design, manufacturing and environmental effects.

Related Background Art

Digital imaging cameras use solid-state image sensors such as CCD or CMOS imagers to convert optical images into electronic signals. As the resolution of the imagers increases, there is a continuous need for optical lenses with increased performance. An important characteristic of the lens is the ability to produce high-resolution images across a wide field of view. Another important characteristic is to produce such high-resolution images using a lens that is of a compact size. The lenses are increasing being incorporated into a variety of electronic devices including not only mobile phones, cameras, sports cameras, computers and computer peripherals, but now also surveillance devices, vehicles, drones and other devices where the lenses and associated imaging system are used for real time guidance of vehicles and surveillance analyses. Incorporation of the lenses into new devices places new environmental performance requirements upon the lens. The lens must be compact and light, to be used in portable devices, and must still maintain high performance characteristics.

Optical systems used, for example, to provide automotive driver assistance and automated piloting of a variety of vehicles have placed new demands on optical lens design. Such optical systems must maintain optical performance in harsh environments where wide temperature excursions can be anticipated. Frequently such systems are fixed focus and require that the image focused on an optical sensor, and thus the back focal length, is maintained over wide temperature excursions.

An imaging module is made of an optical lens, an image sensor, a mechanical device to align the focal plane of the lens with the image sensor, and a processor to control the image sensor and acquire, manipulate and store a digital image.

An optical lens is made of one or more lens element, filter or other optical components that are manufactured with special processes and equipment. Such a lens can be designed with a combination of optical theory and modern lens design software such as Code V or Zemax. This process of designing and manufacturing an optical lens introduces imperfections. Some imperfections are design related, and others are manufacturing related. The design related imperfections may include:

- Sharpness not uniform across the focal plane due to various optical aberrations such as spherical, coma, field curvature and astigmatism
- Chromatic aberrations. Different color light rays focus at different image height known as lateral color, and different color light rays focus at different axial position known as axial color.
- Relative illumination (RI): Brightness falling off from center to edge
- Distortion: a change of geometric shape of the objects
- Change of focal plane location relative to a reference surface on the lens barrel with temperature or other environmental conditions.

Manufacturing related imperfections of the lens are caused by the material limitation, and process and assembly tolerances. The manufacturing imperfection will cause the actual performance of the lens to deviate from design values. Due to the statistical nature of manufacturing tolerances, the actual lens performance will vary from part to part whereas the design imperfections are the same for all parts made of the same design.

An imaging module includes a mechanical frame that is constructed to align the focal plane of an optical lens to the active plane of an image sensor. After alignment is achieved the lens and image sensor position are fixed relative to each other via a mechanical device. The process of aligning the lens to the imager can introduce manufacturing imperfections such as relative positional and angular displacement of the two planes. The alignment errors introduce imperfection in the image performance of the module. For example, the two sides of the image may be out of focus due to a tilt of the lens focal plane to the imager active plane. These imperfections are also statistical in nature. The amount of imperfection varies from unit to unit.

The mechanical device holding the lens to the imager may experience thermal expansion. The thermal expansion of the mechanical device in combination with the intrinsic focal plane change of the lens with temperature may cause the module to be out of optimal focus. The entire or some portion of the image may become less sharp with a change of environmental temperature.

An electronic imager is a semiconductor device manufactured by micro-chip fabrication process. However due to the fact that the pixels in the imagers are inherently analog in nature, the pixel to pixel performance can vary within the same imager, and there is also unit to unit variation.

In summary the lens design imperfection and the statistical tolerance variations of the lens, imager, and module manufacturing processes cause imperfections in imaging module performance. Those imperfections can be design related or manufacturing related. If manufacturing related they can vary from unit to unit causing inconsistent image performance of the module.

There is a need for an imaging device that automatically corrects an acquired image for imperfections, errors, and, aberrations due to the inherent design of the imaging device, manufacturing variations in making the imaging device, and, the environment (temperature and humidity) of the imaging device at the time the image is acquired.

BRIEF SUMMARY OF THE INVENTION

The present invention provides devices and methods for correcting the design and manufacturing imperfections by applying compensation algorithms to the output of the module. The compensation algorithm is based on the lens design parameters, actual manufactured performance of the lens and imaging module, and, environmental conditions such as temperature. The actual manufactured performance is measured using a module performance measurement system and the results are stored in an electronic memory for each module. The correction algorithm compares the actual performance data with an ideal target performance data. It then applies the necessary corrections to the module output to produce a processed output that is more consistent from unit to unit than what can be achieved with manufacturing processes only. The ideal target performance data can be just the design performance based on the lens design data without manufacturing imperfections. In this case the compensation algorithm cancels out the statistical variations of the manufacturing tolerances, thus making all modules having same or almost same imaging performance. In preferred embodiments the ideal target performance of the module is based on an ideal lens model without design imperfections. In this latter case the compensation algorithm cancels out the design related imperfections as well as manufacturing related imperfections that are statistical in nature. The end result is that the module performance is much more ideal and consistent from part to part.

The preferred embodiment includes:

An optical lens with a focal plane, designed and manufactured with performance imperfections.

An electronic imager having an active image surface. The active imaging surface is aligned with the focal plane of the lens forming an imaging module. Module having manufacturing imperfections due to alignment error and imager manufacturing processes.

An electronic memory that stores the lens design and actual performance data of imaging module measured with suitable equipment.

Environmental sensors within the imaging module that detect environmental conditions such as temperature and humidity An image processor that processes the output of the imager using algorithms based on the lens design parameters, measured module performance data, and, environmental conditions such as temperature and humidity, and outputs a processed electronic image signal.

Another embodiment further includes a measurement apparatus that measures the imaging module's optical performance as a function of environmental variables such as temperature and humidity.

Another embodiment further includes software that includes algorithms to correct the imaging modules's optical performance for design, manufacturing, and, environmental variation in the imaging modules

DETAILED DESCRIPTION OF THE INVENTION

Figure 1:
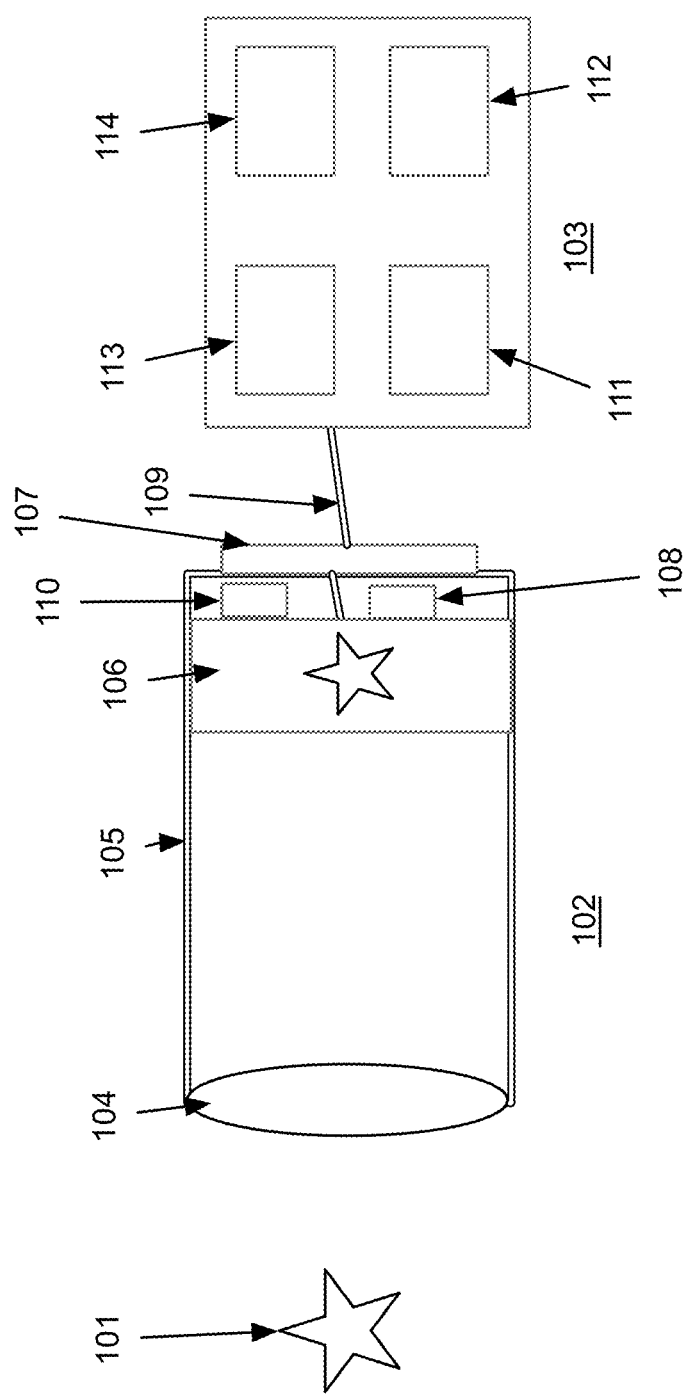
FIG. 1 is a diagram of an imaging module according to the present invention.

FIG. 1 shows a cross section view of an imaging module 102 according to an embodiment of the invention. The imaging module may be configured for any uses as are known in the art. Examples include cameras as handheld devices such digital single lens reflex (DSLR) cameras, other handheld point and shoot cameras, cameras fit into telephone and computer devices, cameras used in automotive applications for backup and other directional cameras, cameras installed upon and used as a visual sensor for self-driving vehicles, cameras used in robotics, cameras used in medical devices, etc. The imaging module is typically cylindrical in shape and the lens 104 is radially symmetric. However, the devices and methods described here would be applicable for any lens 104, frame 105, and sensor 106 geometries. The imaging module is used to capture an image of an object 101 through gathering and focusing the image through an optical lens 104 onto an imaging sensor 106. The imaging sensor 106 and the lens 104 are held in place relative to one another using a mechanical frame 105 that is constructed to align the focal plane of an optical lens to the active plane of the image sensor 106. The sensor 106 is one of those known in the art as comprising an array of individual light sensitive elements, each acquiring an analog signal proportional to intensity of impinging light, and, the analog signal is processed through an analog to digital converter and other electronics such as memory, filters, gain control, etc., 107, to provide a digital signal output 109 representative of an image of the object 101. Non-limiting examples of image sensors 106 include sensors made from charge coupled device (CCD) arrays and those made from Complementary metal oxide semiconductor (CMOS) arrays. The imaging sensor further includes electronic memory 108 that stores parameters that are used to correct the digital image in a computer processor 103. In one embodiment the computer processor is integrated into the imaging module such that the imaging module includes both parts 102, 103 described here. Output of such an imaging module 102, 103 would be processed electronic image data. That is, the raw data acquired by the image sensor 106, converted to a digital form, and, further processed using some or all of the techniques described herein. The techniques include correction for defects inherent in the design of the imaging module, especially the design of the lens 104, correction for defects in the electronic image data due to manufacturing variations in the lens, frame and imaging sensor, and, defects in the electronic image data due to variations in the environment of the imaging sensor. The parameters for all corrections are stored in memory 108. In the preferred embodiment the memory is a nonvolatile electronically programmable read only memory (EPROM) module. The environment data is acquired by a sensor 110. In the preferred embodiment the sensor 110 is a temperature and humidity sensor. In another embodiment the sensor 110 is a temperature sensor.

In another embodiment the computer processor 103 is separated from the imaging module 102 and some or all of the techniques described herein are applied. Such might be the case where a central processor that also performs other tasks is using the image data, or where the image data is initially acquired by a prior art device such as a portable phone or tablet computer, both of which are known to include an environmental sensor 110 in the form of an internal device temperature sensor.

The Imaging module is comprised of:

An optical lens 104 with a focal plane, designed and manufactured with performance imperfections.

An electronic imager 106 having an active image surface. The active imaging surface is aligned with the focal plane of the lens forming an imaging module. The imaging module having manufacturing imperfections due to alignment error and pixel to pixel variations in the electronic imager sensor's manufacturing processes.

An electronic memory 108 that stores the lens design and actual performance data of imaging module measured with suitable equipment.

Environmental sensors 110 detecting the environmental condition such as temperature and humidity An image processor 103 that processes the output of the imager using algorithms based on the lens design parameters, measured module performance data, and, environmental conditions such as temperature and humidity, and outputs a processed electronic signal. This signal may be fed into other processors for further processing such as display, printing, vehicle guidance, pattern recognition, etc.

Figure 2:
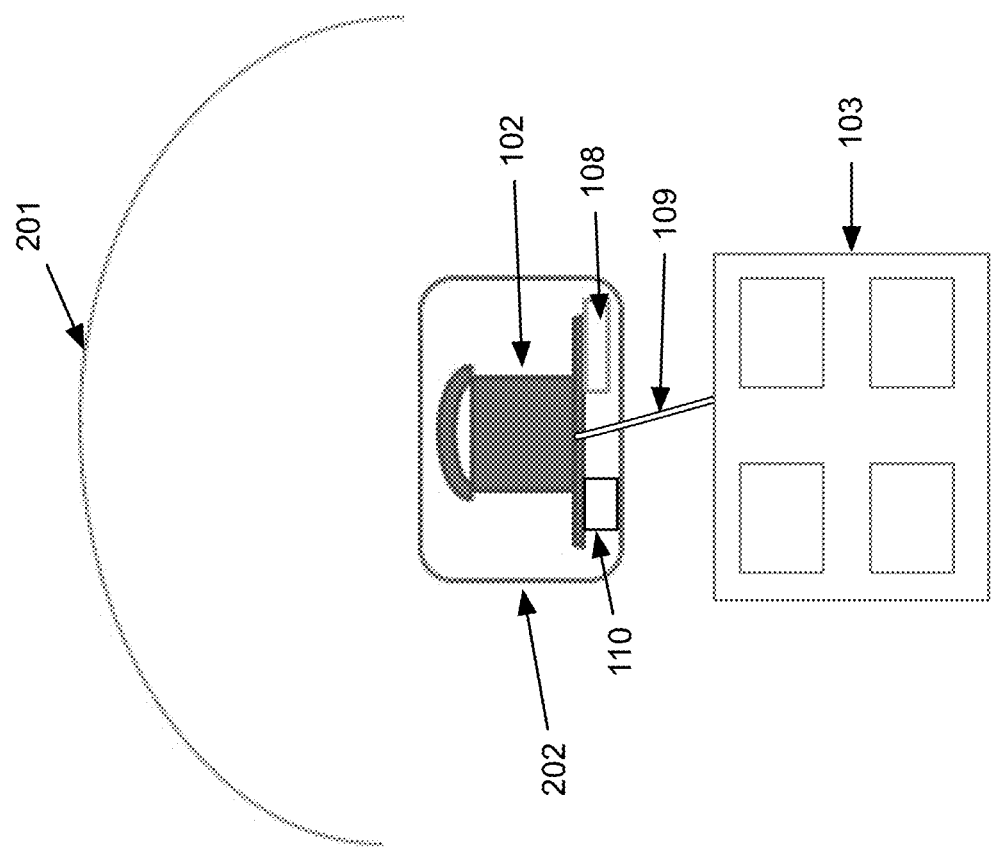
FIG. 2 is a diagram of a measurement apparatus.

An example of an imaging module test apparatus is shown in FIG. 2. A target 201 with a uniformly illuminated background is captured by the imaging module 102 under test.

The illuminated target includes features that allow for measurement of geometric distortion, sharpness in both x and y direction, relative illumination and chromatic aberrations across multiple points on the image plane. The imaging module is contained in an environmental chamber 202 where the environmental condition can be adjusted. Multiple images of the target 201 are captured at various temperature and/or humidity settings within the environmental chamber 202. The output of module with such target is analyzed by computer program by comparing the acquired image with a true image of the test pattern as described in FIGS. 3 and 4 below, and the results, in the form of correction parameters, are stored in a memory location 108 on the module. A true image of the test pattern is an electronic image file that is free of any design, manufacturing and environmental defects, flaws and aberrations that may be introduced by an imaging module. Data from environmental sensor 110 is stored with the correction parameters for each temperature and humidity combination at which images were acquired. In one embodiment correction parameters are selected such that the acquired and transformed image most nearly matches the image of the target 201. The correction parameters are used in algorithms to correct for geometric distortion, sharpness in both x and y direction, relative illumination and chromatic aberrations across multiple points on the image plane.

In one embodiment the correction parameters are selected to minimize the differences between the features on the target 201 as appear in a true image, and, the image of the same features in the acquired and processed image for each temperature and/or humidity range of interest.

In one embodiment the target true image is represented by an array of intensity points Itarget(x, y) and the acquired image is represented by an array of intensities Iimage(x,y). The processed image is a function of the intensities in the acquired image transformed by a function whose parameters are a, b, c, etc. given by Iprocessed(x,y)=f(Iimage(x,y), a, b, c, . . . ). The parameters are selected to minimize (Itarget(x,y)-Iprocessed(x,y))$^2$. The points x,y are a simplification as there is such a set of intensity points I(x, y) for all colors acquired by the imaging module. Typically color filters are red, green, and blue for visible color space applications.

The parameters a, b, c etc, calculated to optimize the image acquired in the test apparatus are stored in memory 108 and the same transformation are applied by computing device 103 on subsequent acquired images using the parameters stored for the particular environmental conditions measured by the sensor 110 at the time the subsequent image is acquired.

Figure 3:
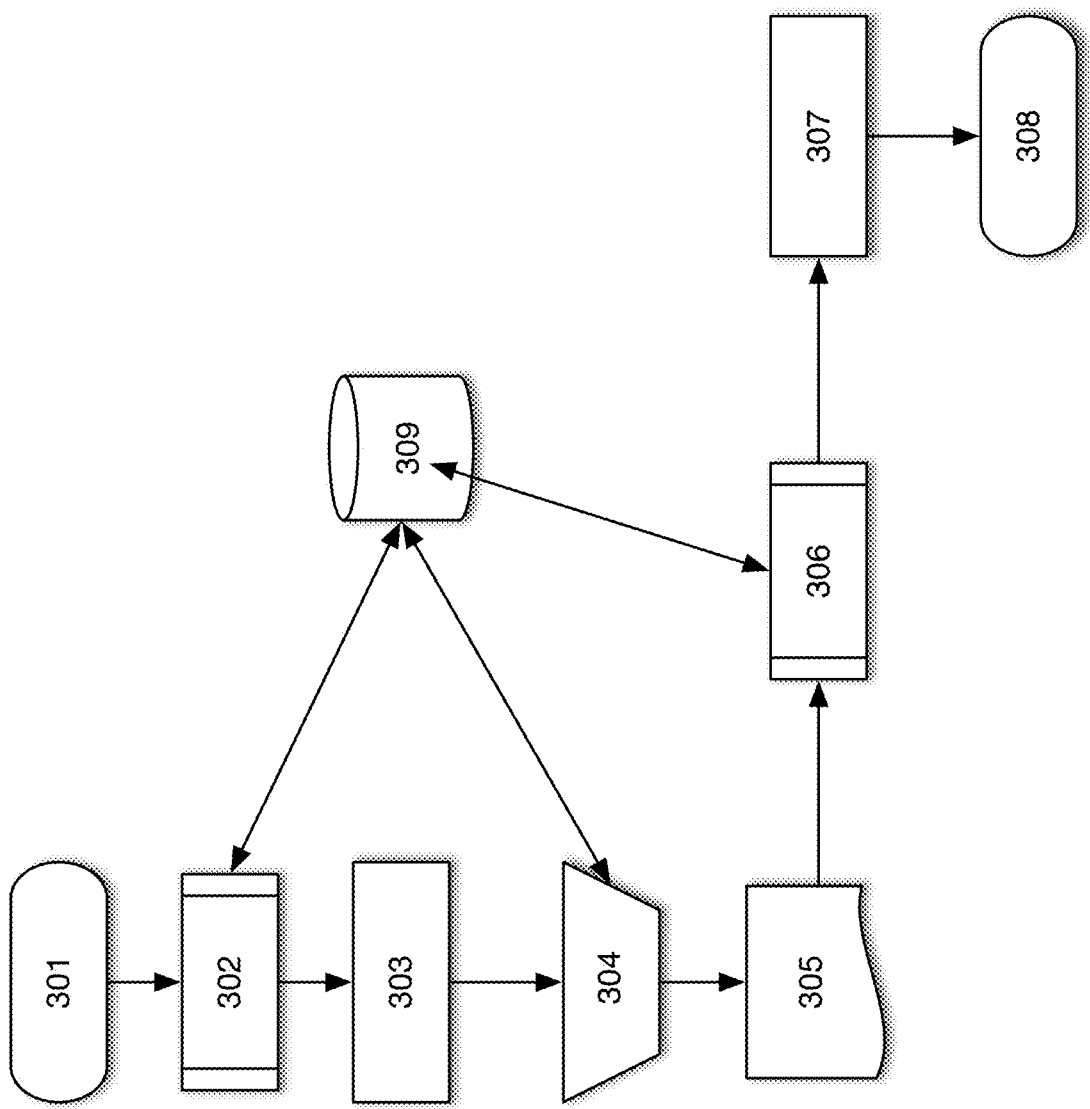
FIG. 3 is a flow chart for a process to correct the optical performance of the imaging module.

FIG. 3 shows a flow chart for the process to produce the processed image. A lens design, imaging sensor and structure for an imaging module is selected or newly designed 301 based upon the desired application. Optical design of the imaging module is a compromise and the design can introduce flaws and distortions in the acquired image. A lens, for example, can be designed with a combination of optical theory and modern lens design software such as Code V or Zemax. The design related imperfections may include:

Sharpness not uniform across the focal plane due to various optical aberrations such as spherical, coma, field curvature and astigmatism Chromatic aberrations. Different color light rays focus at different image height known as lateral color, and different color light rays focus at different axial position known as axial color.

Relative illumination (RI): Brightness falling off from center to edge

Distortion: a change of geometric shape of the objects

Change of focal plane location relative to a reference surface on the lens barrel with temperature or other environmental conditions.

The design related imperfections are simulated 302 through ray tracing and other techniques in lens design programs, and, a first pass set of parameters for correction algorithms are based upon the corrections that would minimize differences between a modeled image (Imodel(x,y)) and the target image Itarget(x,y). This first set of parameters are stored 309. The imaging module is then built and tested 303 in the test apparatus as described in FIG. 2. The results of the test are combined 304 with the initial parameters selected from the optical model at design, and, a set of correction parameters that use both model data and measured data at different environmental conditions are calculated and stored within the imaging module 309 for further use. The imaging module is then used to acquire an image 305 and that image is corrected 306 using the set of correction parameters as stored 309 in the previous step. The processed image is then output 307. The process is then completed 308 and may loop back to repeated acquisition of images 305 that are corrected 306 and output 307.

Figure 4:
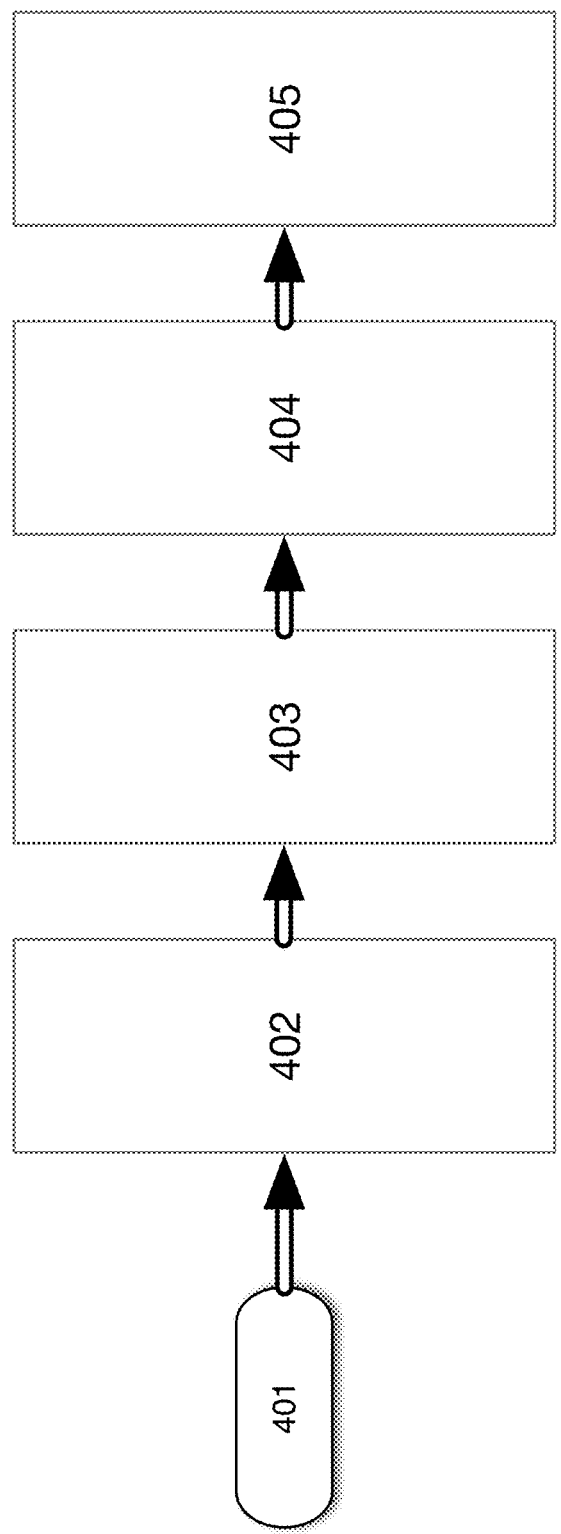
FIG. 4 is a block diagram for a process to correct the optical performance of the imaging module.

In another embodiment the corrections to the acquired image to produce the processed image are done sequentially as a series of subroutines as shown in FIG. 4.

The process begins 401 with selection of design, materials and manufacturing the imaging module. The compensation algorithm comprises several subroutines 402-405:

A subroutine 402 that corrects shape distortion: This algorithm corrects the design related distortion of the lens, and any symmetric or asymmetric error caused by manufacturing misalignment such as lens element decenter and tilting and module lens to imager misalignment and tilting. This algorithm remaps the pixel location globally to the entire image. The final output image can be either completely rectilinear (free of any distortion) or mapped to other preferred projections.

A subroutine 403 that corrects the brightness non-uniformity across the entire image plane caused by design and manufacturing imperfections. It measures the peak intensity of all pixels. It uses a correction factor locally to each pixel to bring up the under exposed pixels to the same output level. In one embodiment, the correction factor parameters are based upon data acquired in the test apparatus as described in FIG. 2 and stored locally in memory on the imaging module. Another embodiment includes measurements of temperature (and in other embodiments other environmental variables) and correcting the image using parameters calculated using the test procedure of FIG. 2 to be specific to the temperature and/or other environmental variables determined by testing under controlled environmental conditions.

A subroutine 404 that sharpens locally. This algorithm applies a localized sharpening filter to each pixel. The appropriate amount of sharpening depends on the local blurriness of image caused by either design or manufacturing imperfections. Environmental conditions can also have an impact on the sharpness of the image. So the sharpening factor is also a function of environmental parameters such as temperature T. The sharpening amount can be x- and y-dependent because of lens astigmatism and asymmetry caused by manufacturing tolerances.

A subroutine 405 that corrects lateral color. Lateral color can be caused by both design and manufacturing imperfections. This algorithm aligns the positions of all color pixels locally. The amount of lateral color varies with the pixel array position.

Depending on the application a combination of the subroutines can be applied selectively.

Although shown and described as linear steps the subroutines 402-405 need not be used serially or even in the order shown.

In another embodiment subroutines are run serially where the first subroutines correct known design flaws in the imaging module that can be modeled and corrected based upon model. Non-limiting examples include geometric distortions, lens aberrations, non-uniform sharpness, chromatic aberrations, and relative illumination. The model parameters are as before stored in memory in the imaging module. Subsequent correction subroutines make use of results of test apparatus measurement and in another embodiment environmental measurements at the time of acquiring images as measured by an internal environmental sensor.

SUMMARY

An imaging module is described that acquires images of objects and outputs a digital image of the objects that is corrected for aberrations and flaws due to design, manufacturing constraints and variability, and, the local environment (temperature and humidity). The imaging module includes memory to store adjustment parameters, environmental sensors, and, a computing device that processes the raw acquired image into a corrected processed image. The imaging module is used with a test apparatus to calibrate the imaging module and calculate empirically determined correction factors that are stored in memory within the imaging module.

I claim:

1. An imaging module comprising:
  a. an optical lens having a lens design, the design including a focal plane, an axial center, an edge, and, a selection of material to be used to make the optical lens and a lens mount to hold the optical lens, and,
  b. an electronic image sensor having an active image plane, and,
  c. a programmable non-volatile electronic memory, and,
  d. a computing device,
  e. wherein a first set of correction parameters, based solely on the lens design, are selected and stored in the programmable non-volatile electronic memory, that minimize differences between a modeled test image as determined by ray tracing of the lens design and a test image, the test image selected to test for:
     i. optical aberrations including spherical, coma, field curvature, astigmatism, and,
     ii. chromatic aberrations including lateral color aberrations and axial color aberrations, and,
     iii. relative illumination including brightness of the modeled test image decreasing from the optical center to the edge of the optical lens design, and,
     iv. a change of a geometric shape of an object included in the modeled test image, and,
     v. a change of the focal plane location with temperature, and,
  f. a second set of correction parameters are selected and stored in the programmable non-volatile electronic memory, the second set of correction parameters selected by the imaging module acquiring an electronic image of an actual test image, correcting the electronic image of the actual test image using the first set of correction parameters, producing a first corrected test image, and, then minimizing differences between the first corrected test image and the actual test image, and,
  g. the computing device is programmed to correct subsequent electronic images acquired by the imaging module subsequent to selecting the first set of correction parameters and the second set of correction parameters, by applying the first set of correction parameters to the subsequent electronic images, producing a first corrected subsequent electronic images, and, then applying the second set of correction parameters to the first corrected electronic images, and, output a final corrected electronic image.

2. The imaging module of claim 1 further including an environmental sensor, the environmental sensor at least one of: a temperature sensor, and, a humidity sensor, and, the second set of correction parameters are further selected to minimize the differences between the actual test image and electronic images of the actual test image acquired by the imaging module at a plurality of environmental conditions as measured by the environmental sensor, and, the computing device is further programmed to acquire an environmental condition surrounding the imaging device at the time subsequent electronic images are acquired and correct the first corrected electronic images using the second correction parameters for the environmental condition measured at the time each image is acquired.

3. A method for creating a corrected electronic image of an object, the method comprising:
  a. selecting a first set of correction parameters, based solely on a lens design, that minimize differences between a modeled test image as determined by ray tracing of the lens design a test image, the test image selected to test for:
     i. optical aberrations including spherical, coma, field curvature, astigmatism, and,
     ii. chromatic aberrations including lateral color aberrations and axial color aberrations, and,
     iii. relative illumination including brightness of the modeled test image decreasing from the optical center to the edge of the optical lens design, and,
     iv. a change of a geometric shape of an object included in the modeled test image, and,
     v. a change of the focal plane location with temperature, and, b. selecting a second set of correction parameters by acquiring an electronic image of an actual test image, correcting the electronic image of the actual test image using the first set of correction parameters, producing a first corrected test image, and, then minimizing differences between the first corrected test image and the actual test image, and, c. programming a computing device to correct subsequent electronic images acquired by an imaging module subsequent to selecting the first set of correction parameters and the second set of correction parameters, by applying the first set of correction parameters to the subsequent electronic images, producing a first corrected subsequent electronic images, and, then applying the second set of correction parameters to the first corrected electronic images, and, outputting the corrected electronic image.

4. The method of claim 3 further including measuring a temperature and a humidity of the imaging module when acquiring the electronic image of the actual test image, and, the second set of correction parameters are further selected to minimize the differences between the actual test image and electronic images of the actual test image acquired by the imaging module at a plurality of environmental conditions as measured by the environmental sensor, and, the computing device is further programmed to acquire an environmental condition surrounding the imaging device at the time subsequent electronic images are acquired and correct the first corrected electronic images using the second correction parameters for the environmental condition measured at the time each image is acquired.

* * * * *